(12) United States Patent
Arslan et al.

(10) Patent No.: US 9,818,405 B2
(45) Date of Patent: Nov. 14, 2017

(54) DIALOG MANAGEMENT SYSTEM

(71) Applicant: SESTEK Ses ve İletişim Bilgisayar Tekn. San. Ve Tic. A.Ş, Istanbul (TR)

(72) Inventors: Mustafa Levent Arslan, Istanbul (TR); Tülin Ebcioğlu, Istanbul (TR); Çağatay Yurdasal, Istanbul (TR); Halil Ibrahim Kalkan, Istanbul (TR); Ayşe Nuran Eyaz, Istanbul (TR); Ibrahim Onat, Istanbul (TR)

(73) Assignee: SAESTEK Ses ve Iletisim Bilgisayar Tekn. San. Ve Tic. A.S., Istanbul (TR)

( * ) Notice: Subject to any disclaimer, the term of this patent is extended or adjusted under 35 U.S.C. 154(b) by 0 days.

(21) Appl. No.: 15/069,966

(22) Filed: Mar. 15, 2016

(65) Prior Publication Data
US 2017/0270921 A1    Sep. 21, 2017

(51) Int. Cl.
*G10L 15/22* (2006.01)
*G06F 17/27* (2006.01)
*G10L 15/06* (2013.01)
*G10L 15/08* (2006.01)
*H04M 3/493* (2006.01)

(52) U.S. Cl.
CPC .......... *G10L 15/22* (2013.01); *G06F 17/2705* (2013.01); *G06F 17/279* (2013.01); *G06F 17/2795* (2013.01); *G10L 15/063* (2013.01); *G10L 2015/088* (2013.01); *G10L 2015/221* (2013.01); *G10L 2015/223* (2013.01); *H04M 3/4936* (2013.01)

(58) Field of Classification Search
CPC ........................... G10L 15/22; G10L 2015/223
See application file for complete search history.

(56) References Cited

U.S. PATENT DOCUMENTS

| 5,873,107 | A | * | 2/1999 | Borovoy | ............... G06F 17/276 707/999.003 |
| 7,065,188 | B1 | * | 6/2006 | Mei | ........................ G10L 15/22 379/76 |
| 2003/0171910 | A1 | * | 9/2003 | Abir | .................... G06F 17/3061 704/1 |
| 2008/0319733 | A1 | * | 12/2008 | Pulz | ........................ G10L 15/22 704/1 |

(Continued)

*Primary Examiner* — Douglas Godbold
(74) *Attorney, Agent, or Firm* — Gokalp Bayramoglu

(57) ABSTRACT

A dialog management system functioned by a special search algorithm, the search algorithm comprises the rule of recognizing the phrase directly, converting the words into terms, filtering the adjacency terms and recognizing, the dynamic field the Dialog Management System comprises: an application conducting a predefined operation between a user and a terminal; an input unit receiving an utterance from the user; recognition unit recognizing and converting the received utterance from sound into sequential words in a written text; processor; wherein the processor comprises dynamic field recognition unit; conversion unit, filter unit, a matching unit; a database storing a dictionary that includes the all of the definition of words and the word-term list.

14 Claims, 22 Drawing Sheets

(56) References Cited

U.S. PATENT DOCUMENTS

| | | | |
|---|---|---|---|
| 2009/0287484 A1* | 11/2009 | Bushey | G10L 15/063 704/231 |
| 2010/0057456 A1* | 3/2010 | Grigsby | G10L 15/22 704/235 |
| 2010/0229116 A1* | 9/2010 | Murase | G01C 21/3608 715/810 |
| 2010/0286979 A1* | 11/2010 | Zangvil | G06F 17/273 704/9 |
| 2011/0004610 A1* | 1/2011 | Rose | G06F 17/277 707/759 |
| 2013/0173267 A1* | 7/2013 | Washio | G10L 15/197 704/240 |
| 2013/0246050 A1* | 9/2013 | Yu | G10L 15/1822 704/9 |
| 2015/0142704 A1* | 5/2015 | London | G06N 5/04 706/11 |
| 2015/0348551 A1* | 12/2015 | Gruber | G06F 17/2705 704/235 |
| 2016/0063994 A1* | 3/2016 | Skobeltsyn | G06F 17/271 704/257 |

* cited by examiner

DIALOG MANAGEMENT SYSTEM

TECHNICAL FIELD

This invention generally relates to a dialog management system, and more particularly relates to methods for managing dialog within a speech system.

BACKGROUND in the recent years, smart devices are more widely used in the world, people are also more demanding on the intelligence of their smart devices. Under such condition, the speech recognition system emerged as a requirement of many systems. This technology is,progressing but is still not as intelligent as people require. Most of the existing technology cannot he referred to as smart because they lack accuracy and cannot understand the user's intention very well. Some systems are highly accurate but will employ a large amount of resources for running the algorithm.

Accordingly, it is desirable to provide an improved method for the understanding of the user's intention, and especially manage speech dialog to improve the accuracy of the searched content and matched result, as well as the response operation.

Dialog Management Systems aim to provide ability to design, observe and develop verbal dialogs between human users and computer systems. In general, creating natural dialogs are the target of these systems. Topology generally comprises of a speech recognizer, an AI or intent manager and/or a slot parser, and an announce module (which can be a TTS or record player).

After an utterance is recognized via recognizer the first step should be determining user's intent. Depending on specified intent, intended operation and its parameters differ. In order to determine true intent, many applications use statistical matching algorithms. Also, in "Apparatus and method for spoken language understanding by using semantic role labeling", semantic role labeling like part of speech tagging is suggested. Although this method is a solution for intent matching, it is difficult to implement for different applications and languages. In addition, automatic part of speech tagging systems have a margin of error and this may lead to inaccuracies in intent determination.

Most of the previous systems assume that they have prior information about the context when determining the intent of the user. However in a natural dialog system users may often move out of context and switch their intent. Therefore, this leads to inaccuracies in the dialog system responses.

In most applications dynamic field slots are filled with information which matches an item in a preconditioned list. For example, in "Adaptive knowledge base of complex information through interactive voice dialog" pre-determined frames contain pre-determined vocabulary with slot filling intention. This structure offers filling the slots after revealing intention which means utterances comprising related/important information may be missed as a result of undetermined intention.

On the other hand, this situation may create loss of information about true intent. Utterance may contain such words carrying information about the cut; on the other hand they should be also taken as dynamic fields. In this case, the solution mentioned above and the one explained in "Trainable sentence planning system" lack of an algorithm which is able to process intent matching and form filling processes simultaneously.

Most current IVR based call routing systems are based on voice XML grammar design. However, designing a voice XML grammar requires special expertise and it is very difficult for them to handle out of grammar words and garbage words. For each new implementation this grammar has to be built from scratch and leads to significant effort consumption.

In a natural dialog, correction of information or change of decision is smoothly done by replacing the dynamic slots in an utterance. In response listener accepts new info as a correction. For instance, if the utterance "I want to buy two cones of ice-cream with no-topping" is followed with "make it chocolate sauce toppings", the slot "no-topping" replaced by "chocolate sauce topping". On the other hand, in some cases instead of replacing the content, it should be expanded. If the utterance "I want to buy two cones of ice-cream with no-topping" is followed with "and a slice of pie", that means both desserts are requested by the user. Most current dialog systems have significant difficulty in handling these situations.

In current dialog systems the prompts that are read by the system to the users are managed by the client application. Therefore the intents are designed in the dialog system and prompts are designed in the client application. This requires management of both systems at the same time and requires significant coding or configuration on the client application.

The responses of the dialog system in current solutions are static in general. The system always responds with the same information or question for the same user intent. This leads to a mechanical dialog experience for the user.

Traditional dialog systems do not take into account the demographics of the user profile or past dialog history in order to determine the speaking style or persona of the dialog manager. This leads to an unnatural dialog. For example the person informally says "What's up" and the system responds with a serious answer like "I am very fine, thank you".

SUMMARY OF THE INVENTION

This invention aims to provide a dialog management system which operates a unique intent matching algorithm which is equipped with advanced form filling capabilities. The proposed system also manages the dialog in a natural sense by not responding with a single response template. It changes response strategy automatically depending on the intent and is sensitive to abrupt changes in context and intent. At the end, it is easy to adapt to different implementations.

This invention provides some new feature and technology for creating a new dialog management system, which comprises:

I. Term Mapping: there is term mapping structure in the invention. The input utterance is first sent to speech to text engine and next converted into a term sequence based on a word-term mapping dictionary which is prepared for each language only once.

II. The search algorithm:
  a. The dynamic parameters are regarded also as terms in context matching.
  b. Changing dialog route by a novel intent search algorithm
  c. A two-step decision making procedure for intent determination in dialog discourse.
    Additional information is appended to previous input from the user and a check is made if new lamination helped us to narrow down the number of possible intents. If new information didn't help us to increase match score, we ignore the previous input from the user and search among all possible intents from start. This helps us to find the correct intent if the user changes his/her intent during the discourse of the dialog.

d. Preventing unnatural ambiguities with ignorable menu feature

III. Adjacency Filtering

IV. Dynamic Fields a. An algorithm to overwrite a dynamic field slot with occurrence restriction b. An algorithm to set a dynamic field mandatory c. Using DF for intent matching V. Announcement Management a. An algorithm to fuse different response approaches (General announces+Node specific announces).

b. An algorithm to create specific multiple match responses.

c. Using dynamic fields in announce context (For both audio and text responses).

d. Using categorization in terms, phrases and dynamic fields for persona selection.

VI. Dynamic fields—Model training integration

A method for dialog management is provided, wherein the method comprising the steps of:

S1000: receiving an utterance from a user;

S2000: recognizing and converting the utterance from sound into sequential words in a written text:

S3000: determining if there is a phrase in the written text matching with a predefined phrase in a menu tree; wherein the menu tree comprises a root node, the root node comprises a plurality of parent nodes, and each parent node comprises at least one leaf node, each leaf node corresponds to an operation, each of the predefined phrases corresponds to a parent node or a leaf node;

if multiple phrases are matched in the menu tree,

S3110: converting the sequential words into corresponding predefined terms in sequence, wherein different words with similar meaning are converted into a same term; each of the predefined terms corresponds to a parent node or a leaf node;

S3120: matching terms with the corresponding parent node or leaf node in the phrases matched nodes;

S4000: conducting the operation according to the matched term node:

if a single phrase is matched in the menue tree,

S3210: matching the phrases with the parent node or the leaf node,

S4000: conducting the operation according to the phrase matched node.

if no phrase is matched in the menu tree,

S3310: converting the sequential words into corresponding predefined terms in sequence, wherein different words indicating the same intent are converted into a same term;

S3320: matching the terms with the corresponding parent node or leaf node in all nodes;

S4000: conducting the operation according to the terms matched node.

Furthermore, in order to manage searching, a probabilistic score in percentages for every node by comparing the teens in input text and the term series on the tree nodes one by one is calculated.

Furthermore, if all nodes take the score of zero percent, the search result will be "No Match";

if the highest score is taken by a single node, this node will be selected as matching menu. The search result will be "leaf match", if the matching menu does riot have any child node. Obtaining a leaf match can be interpreted as operation is done according to DMS (Dialog Management System) because there is not any need for further information to reach the correct menu.

if the highest score is taken by multiple nodes, the search result will be "parent match". After parent match, client is expected to demand for more detailed information from the end user in order to reach a leaf match. If the next attempt gives enough information about the correct menu, it will result in a leaf match.

Furthermore, the terminal executes the operation according to the matched result;

Furthermore, announcement is used to transfer a message to the user, wherein there is specified text or a given record stored in the system.

Furthermore, an indicator of dynamic field collection completion, which is true/false parameter, is also sent to terminal in order to decide whether all of necessary dynamic fields are collected or not. If the indication is not collected, terminal has the option to request the missing parameters.

There are multiple advantages of this invention:

I. Context matching via term mapping over statistical matching, which is fast and easy to implement and reduce complexity.

II. Simultaneous intent matching and form tilling capability.

III. Implementation convenience of language specific term mapping

IV. Dynamic fields—Model training integration

V. Opportunity to overwrite or augment a dynamic field slot

VI. A general announce template can be used with intent specific announces assisted by unique disambiguation announces.

VII. Automatic dialog path change detection.

BRIEF DESCRIPTION OF THE DRAWINGS

FIG. 4 shows an example of term list.

FIG. 26 illustrates the announcement management.

DETAILED DESCRIPTION OF THE INVENTION

Figure 1:
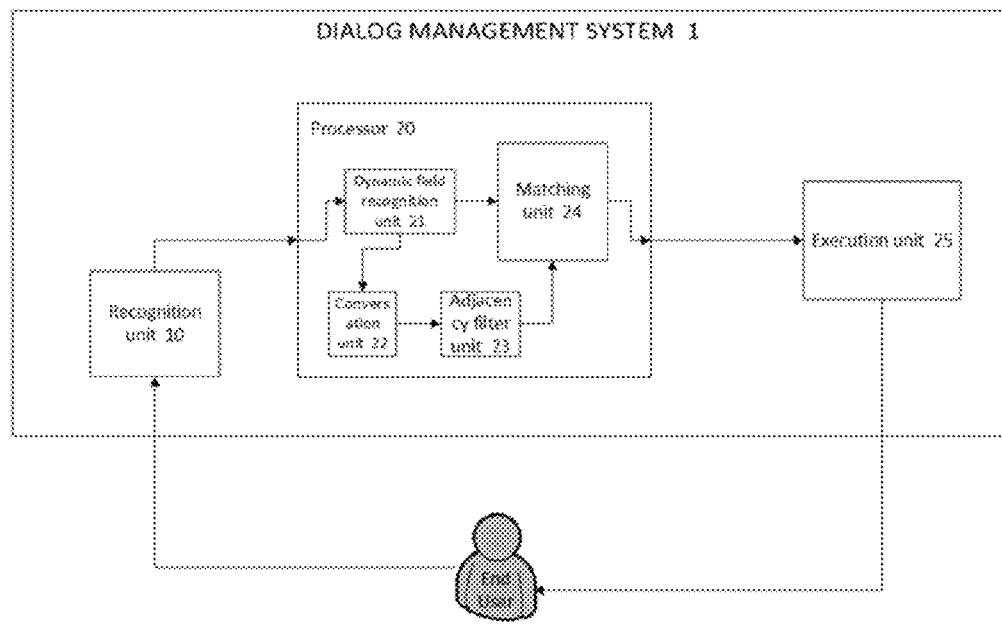
FIG. 1 illustrates the communication between the end user and dialog management system.

Herein describe some general descriptions abbreviations. "SR" refers to Speech Recognition, the process that converts speech data from sound recording into written text. Referring to FIG. 1, "Recognized text" refers to output text of SR. Recognized text is used as input to the menu search step in the dialog management system architecture. "CV" refers to Confidence Value is a self-evaluation value that indicates reliability of SR output. A recognized text with higher CV has a higher possibility of match with the true text of the utterance. "DMS" refers to Dialog Management System is a combination of speech recognition and natural language understanding technologies. DMS technology determines the intent of the users in a dialog system accurately. "Terminal" refers to any system or device that uses DMS with the aim of user interaction. "End user" refers to a person interacting with a terminal by speaking to it. "Menu tree" refers to an undirected graph in which any two nodes are connected by a single path. Every node represents a menu and similar menus are gathered under a parent menu. Menus are grouped from parent nodes to leaf nodes according to their similar relationship. Also, the leaf nodes should define an exact operation, and parent nodes should be used for classification. There are some match types at the end of searching on the menu tree: "Leaf match", "Parent match", "Multiple match", and "No match", wherein "Leaf match" refers to a single node match that has not any child node is found by the algorithm; "Parent match" refers to a single node match that has one or more child nodes is found by the algorithm; "Multiple match" refers to that multiple nodes are found by the algorithm; "No match" refers to that no any node is matched by the algorithm.

As shown in FIG. 1, the Dialog Management System comprises: an application conducting a predefined operation between a user and a terminal; an input unit receiving an utterance from the user; recognition unit 10 recognizing and converting the received utterance from sound into sequential words in a written text; processor 20 determining if there a phrase in the written text matching with a predefined phrase in a menu tree; wherein the menu tree comprises a root node, the root node comprises a plurality of parent nodes, and each of the parent node comprises at least one leaf node, each leaf node corresponds to an operation, each of the predefined phrases corresponds to a parent node or a leaf node; wherein the processor comprises dynamic field recognition unit 21 for recognizing at least one dynamic field in the written text; wherein the dynamic fields are names or numbers, conversion unit 22, filter unit 23 for filtering the converted terms to obtain key terms and a matching unit 24; wherein the conversion unit 22 is capable of converting the words into predefined terms in sequence according to a word-term list, wherein different words indicating the same intent are converted into a same term; each of the predefined terms corresponds a parent node or a leaf node; the matching unit 24 is capable of matching the terms or the phrases with the corresponding parent node or leaf node; execution unit 25 executing the operation according to the matched result; a database storing a dictionary that includes the all of the definition of words and the word-term list.

Wherein, the input unit connects to the recognition unit, then the recognition unit connects to the processor, then the processor connects to the execution, and the recognition unit, the processor and the execution unit respectively connect to the database.

Figure 2:
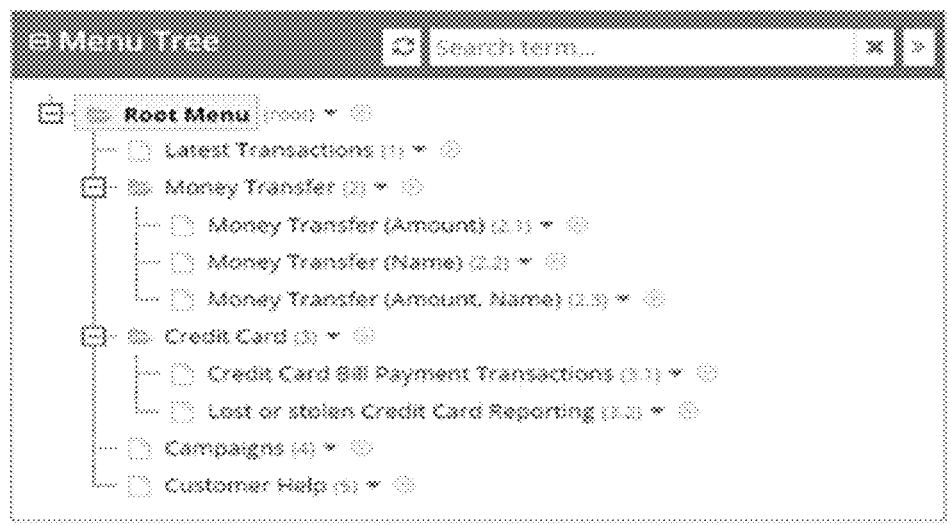
FIG. 2 shows a Dialog Management System menu tree.

Referring to FIG. 2, a DMS menu tree is illustrated. Multiple matches may occur on any menu without considering node type.

Figure 3:
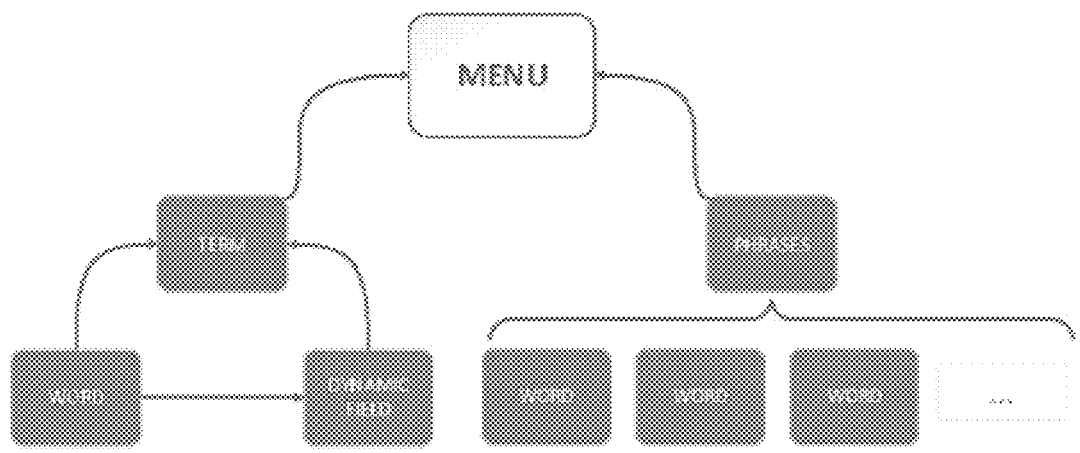
FIG. 3 shows the hierarchy of main search algorithm elements.
Figure 5:
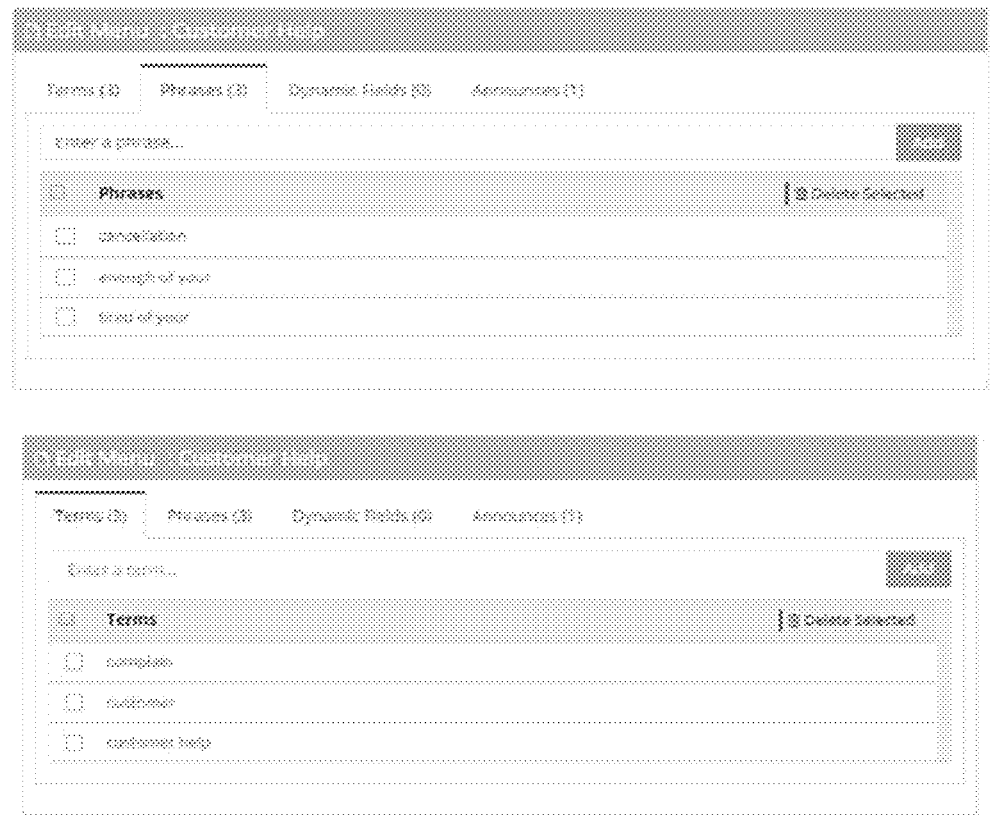
FIG. 5 shows terms on Customer Help menu and. Phrases on Customer Help menu.

Referring to FIG. 3, the hierarchy of main search algorithm elements is illustrated, wherein the definition of "words", "terms", "phrases" and "dynamic fields" are described as below.

Words

A "word" is defined as a recognized (by Speech Recognition) representation of spoken sound winch must be predefined in the dictionary stored in the database. If any user speaks a word which hasn't been defined in a dictionary of SR, it will be recognized as a new word by the DMS and stored in the dictionary. In the end, the words in a given recognition result build a meaning together. In order to extract true meaning/intent of the sentence, focusing on the words that have greater impact on the overall meaning is the solution here. Consider "I want to wire some money" is said by the user. The words "I", "want", "to", "some" are not giving a clue about the intention. Although "wire" and "money" are enough to be understood by the system. Furthermore, the word "money" can be used in many sentences with different intentions.

So there should be more elements to differentiate these words from each other and create a systematic approach to catch connections between words.

Terms

FIG. 4 illustrates some terms of the menu tree.

Users may use different words to indicate the same intent. For example, in the sentence "wire money" the word "wire" can be used interchangeably with "transfer." In addition, suffixes or verb inflections, in general, do not change the meaning of a word (e.g., "wire", "wired", "transfer", and "transferring"). In order to create semantic connection between these collection of words, terms are created to indicate all of the predefined words. The term "transfer" is defined as a label for words with similar meanings (e.g., "wire", "wired", "transfer", and "transferring").

In order to decrease the amount of work on both users and the search module, the term structure, which can be seen as a preprocessing step, is prepared. It contains two elements: Words and tennis.

Words may become varied considering affixes. Although the meaning will be slightly different in cases in which inflectional suffixes are used, the root portion of the word's meaning is preserved. On the other hand, derivational suffixes create a new word which should be taken to have a new meaning. This separation in suffixes gave an idea to formulate a process mapping words with inflectional suffixes and in root form into a single word, namely, a "term".

By creating individual terms, words with close meanings are unified under a single concept. e.g., "money", "cash" and "coin" are instances of the same idea: "money". When matching a given SR output text with a specific intent instead of populating many different word sequence combinations as possible candidates, matching the term form of each recognized word among the list of terms is easier.

Phrases

The concept of a "phrase" in our framework is especially useful for disambiguation purposes. If a specific phrase such as "cancel my account" is contain ed in an SR output text, and this phrase is associated with "cancellation" intent then we want to skip running the matching algorithm to attach a specific intent to the given SR output word sequence among all possible intents. We directly tag this utterance as "cancellation" request.

At the end, terms are used for general situations, and have a chance to match with relevant menu if given words (term) are matched. On the other hand, phrases are selected over specific expressions with the aim of creating proper solutions for exceptions.

Dynamic Fields

Figure 6:
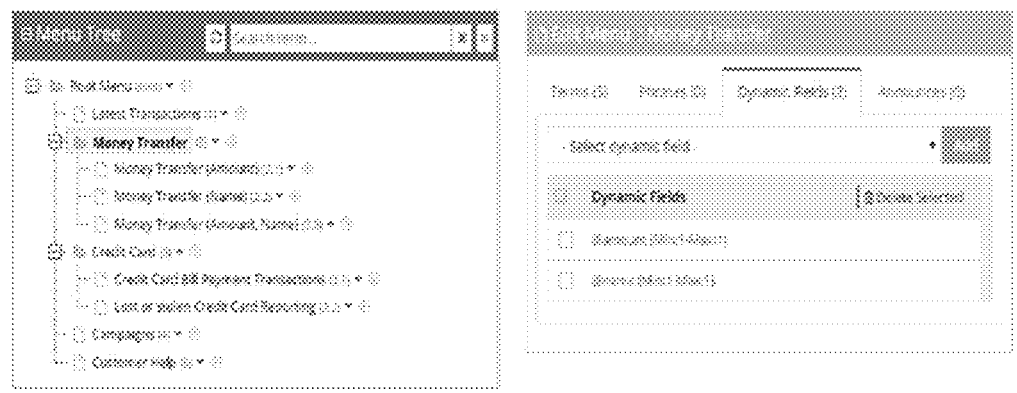
FIG. 6 shows dynamic fields.

Referring to FIG. 6, a diagram of Dynamic fields is illustrated.

As mentioned before, the terns structure uses a mapping list to match different words with same root to their corresponding terms. Although it eases the process for general words, special words like numbers and names have different roots from each other. From the perspective of search algorithm, all special names are just names.

For example, expressions "wire money to John" and "wire money to Smith" are viewed as identical search algorithms. Since the difference of receivers changes only the parameters needed by the money transfer operation but the matching node remains the same, both sentences define wiring money. From the search algorithm's perspective there is only a name in the sentence as "wire money to @name". As it can he seen both "John" and "Smith" can come under the single dynamic field, "@name".

Dynamic field slots are used for defining the number of expected dynamic fields, Every dynamic field has a minimum and maximum occurrence threshold in order to handle inadequate or excessive data. These thresholds are defined as minimum and maximum slot values.

The only restriction for a dynamic field is that there should be a list and rules to define a dynamic field. For example, the number "two" in "last two transactions" and "two dollars", has different meanings in each sentences. In this case, while the @count dynamic field contains "two", is not dependent on anything, @amount is dependent on existence of "dollars" word placed afterwards. By doing so, similar conflicts are solved.

Dynamic fields also make it easy to pass parameters to the terminal. As the example above states, some dynamic fields are dependent on predefined rules, the others are not. The predefined rules are important for creating dependencies and sematic connections between words. Whether rules are used or not, in both cases DMS leads users in corresponding menus based on their words while transmitting dynamic fields separately. In this way, the terminal of DMS knows whether important information is given or not. Considering aforementioned count or currency dynamic fields, they are both carrying information that is needed to execute necessary transaction. DMS provides this type of parametric information without any effort.

The second key point is creating neat tree designs. Once a dynamic field is created, all the words that are defined in the dynamic field become unified from the perspective of the search algorithm. By using the @[name of the dynamic field] syntax, the dynamic field can be used as a term. For example, @amount dynamic field only accepts a number and currency together. But it contains a great number of combinations such as "one dollar", "two dollars", "one thousand euros", "two hundred pounds", etc. Adding @amount to a node on the tree is enough for adding all these combinations. Also a system with several trees needing the same dynamic fields can use the same definition and eliminates duplicate work.

After a dynamic field is created, it should be added to the menu as a term, representing the dynamic field. The dynamic fields have a valuable contribution to menu searching process. In situations where only a name is clarified rather than transaction itself, e.g., saying "John", dynamic fields give a clue about the menu, e.g., "Money transfer". In this case, the user said the name of a person, and, as a result, the corresponding menu should be a transaction related with somebody else.

After the search algorithm finds the appropriate match in the given menu, the system returns dynamic field values separately, because the terminal still needs to name of the receiver in order to accomplish transaction.

Although the dialog management system covers both utterances and written inputs, we separately considered speech recognition. Because of the extremely large number of possible words and sentences, it is very those consuming to cover all possible combinations. In order to ease this process, dynamic fields are also used in opposite of the aforementioned working process. Sentences containing dynamic fields are given to the DMS in order to produce training sentences. DMS produces possible training sentences for the given sentences. For instance, if "send @amount to @name" sentence is added to DMS sentence list only once by the user, and DMS creates every possible version of this sentence. Assuming names are listed as "Sarah, John" and amounts are "50 dollars, 100 euros". The outputs of these lists are "send 50 dollars to Sarah", "send 100 euros to Sarah", "send 50 dollars to John", and "send 100 euros to John". Considering the number of dynamic fields and the items in the lists are greater, the manual training process (which means every possible word should be filled during the implementation) will be enormous. On the other hand the DMS diminishes the effort to a minimum by using its model training integration.

Figure 7:
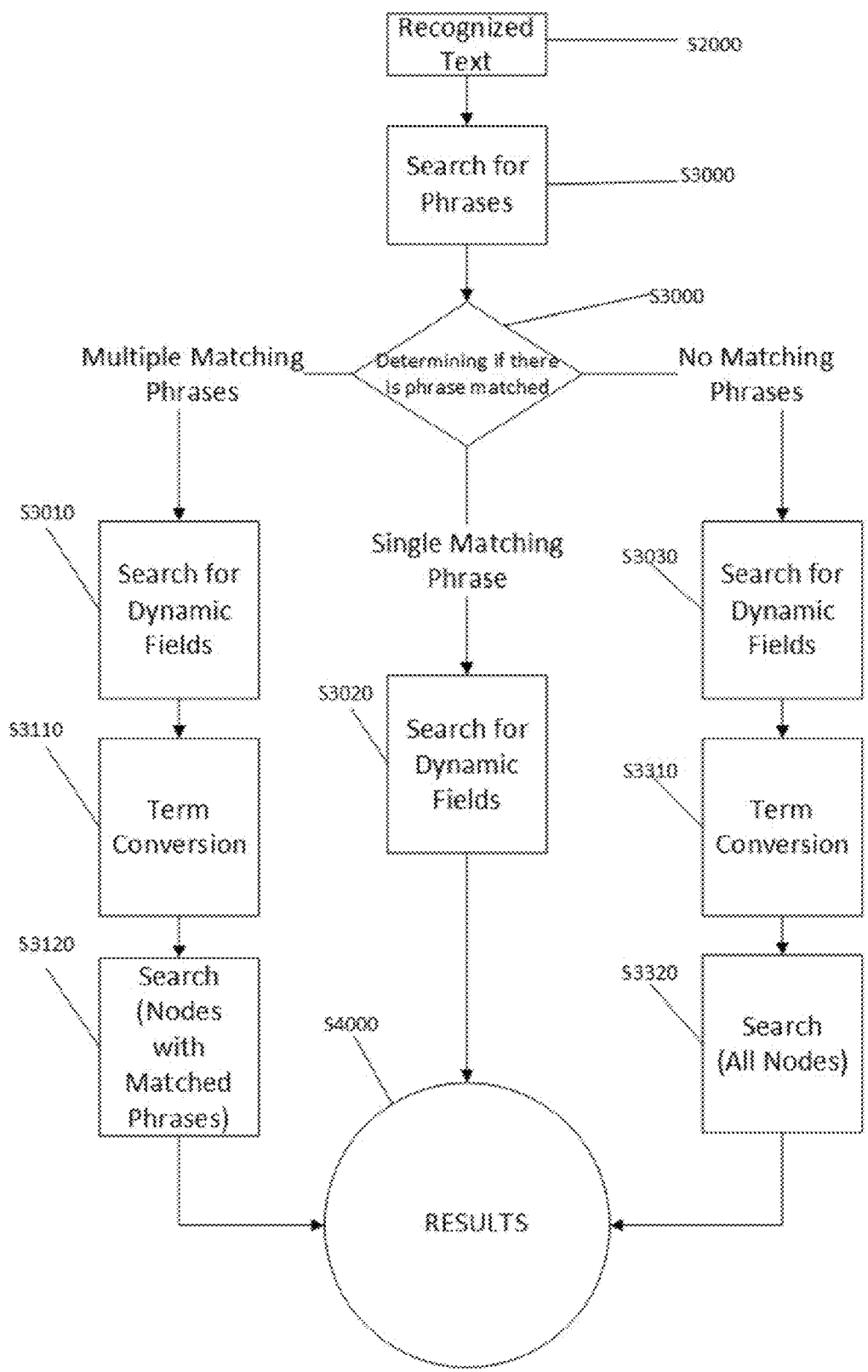
FIG. 7 shows the search steps for every possible outcome.

Based on above description, this inventive algorithm performs its steps one by one in a harmony by using defined elements with given order as shown in FIG. 7. The DMS receives an utterance from an end user'and recognized the user's utterance into written text with a word sequence. Then the search algorithm is performed to search for phrases first. Since phrase search targets to perfect match between predefined word sequences and the recognized words, it has no tolerance any change, which means any small difference will create a mismatch with a given phrase. In order to accomplish phrase matching, the word sequence of the end user should be searched before any change on given input text. After the phrase search done, the word sequence may be converted into terms. The step can be as follows as shown in FIG. 7:

S1000: receiving an utterance from a user;

S2000: recognizing and converting, by the computer, the utterance from sound into sequential words in a written text;

S3000: determining, by the computer, if there is a phrase in the written text matching with a predefined phrase in a menu tree; wherein the menu tree comprises a root node, the root node comprises a plurality of parent nodes, and each of the parent node comprises at least one leaf node, each leaf node corresponds to an operation, each of the predefined phrases corresponds to a parent node or a leaf node;

if multiple phrases are matched in the menu tree,

S3110: converting the sequential words into corresponding predefined terms in sequence, wherein different words indicating the same intent are converted into a same term; each of the predefined terms corresponds to a pare it node or a leaf node;

S3120: matching the terms with the corresponding parent node or leaf node in the phrases matched nodes;

S4000: conducting the operation according to the terms matched node;

if a single phrase is matched in the menu tree,

S3210: matching the phrases with the parent node or the leaf node,

S4000: conducting the operation according to the phrase matched node.

if no phrase is matched in the menu tree,

S3310: converting the sequential words into corresponding predefined terms in sequence, wherein different words indicating the same intent are converted into a same term:

S3320: matching the terms with the corresponding parent node or leaf node in all nodes:

S4000: conducting the operation according to the terms matched node.

There are three possible outcomes at this level:

The first outcome happens if there is not any phrase match in entire tree. In this situation, the algorithm jumps to the next step.

The second outcome happens if there is only one node with a matching phrase. At this point, the algorithm jumps to the next step as a last act for a dynamic field match and concludes its search for input text and returns the matching menu as a result.

The last outcome happens if there are many nodes containing a phrase match. The algorithm jumps to next step again, but this time it memorizes matching nodes.

To give an example, let's imagine two different customers. One of them wants to be informed about possible campaigns, the other one is tired from campaign messages. They are both faced with the same menu tree.

Figure 8:
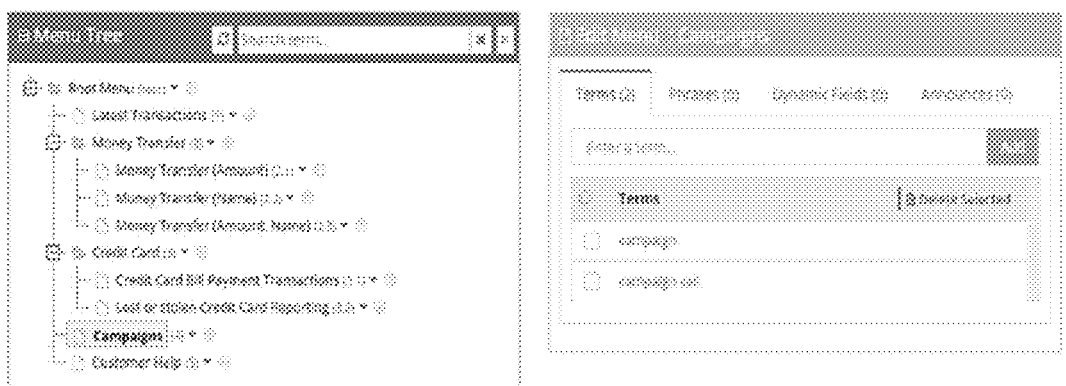
FIG. 8 shows the terms of the "campaign" menu.

As given in FIG. 8, the Campaigns menu contains the terms campaign and call. Both of these terms should lead both users to the Campaigns menu since their words are "I had a campaign call, want to get info about it" and "I am tired of your campaign calls." In order to differentiate these situations, phrases are taken into account.

Figure 9:
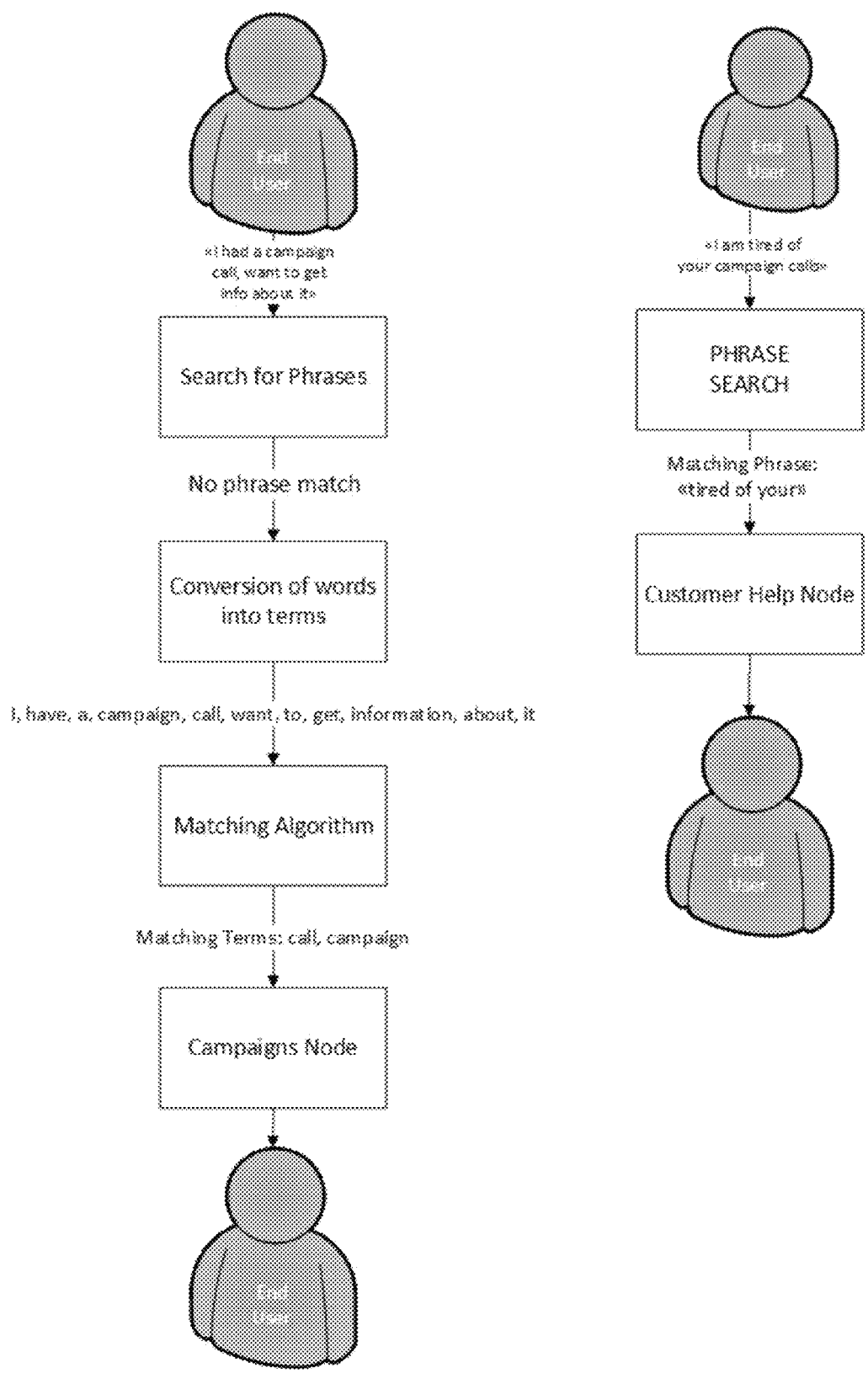
FIG. 9 shows a comparison between a term search and a phrase search.

Referring to FIG. 9, a comparison between "term search" and "phrases search" is illustrated.

After the Search for Phrases has completed, the search algorithm is then performed to search for Dynamic Fields. At this, point, defined dynamic fields are searched. If a dynamic field cannot be found, the algorithm continues with term detection.

Alternately, if the algorithm finds one or more dynamic fields, the algorithm will fill the corresponding slots and manipulate the search text by replacing words with corresponding dynamic fields. After this step is taken, the algorithm will not see the recognized word of the dynamic field. Instead, it will see the term of that dynamic field. For example, "send 50 dollars to john" becomes "send @amount to @name". Apart from sentence, the algorithm will keep the mappings as "@amount=50 dollars", "@name=john".

In some cases, more than one instance of dynamic fields must be detected, such as "wire money to John and Jill". If defaults of minimum and maximum values of slots are used, which is minimum=1 maximum=1, the algorithm will accept only the last occurrence "Jill", and the sentence will be "wiring money to @name and @name" with "@name=John, @name=Jill". However, the system will post only "@name=Jill" to the terminal. In order to achieve posting both John and Jill as @name, minimum and maximum instance counts should be suitably determined. If minimum value is given one and maximum value is two, the algorithm will accept up to two instances, but it cannot be less than one. In the final form, both of the names will be posted as "@name=John, @name=Jill".

In general, if the maximum threshold is exceeded, the last instances are accepted or overwritten. Continuing from the last example, with minimum =1 and maximum=2 thresholds, "send money to John, Jill, Amy and Max" will be interpreted as "@name=John, @name=Jill, @name=Amy, @name=Max", but posted as "@name=Amy, @name=Max".

On the other hand, if the minimum threshold is not exceeded the terminal will be informed about necessity of more dynamic field,matches in addition to current ones. Depending on the terminal's decision, the user may be asked to input the necessary dynamic fields to continue.

Figure 10:
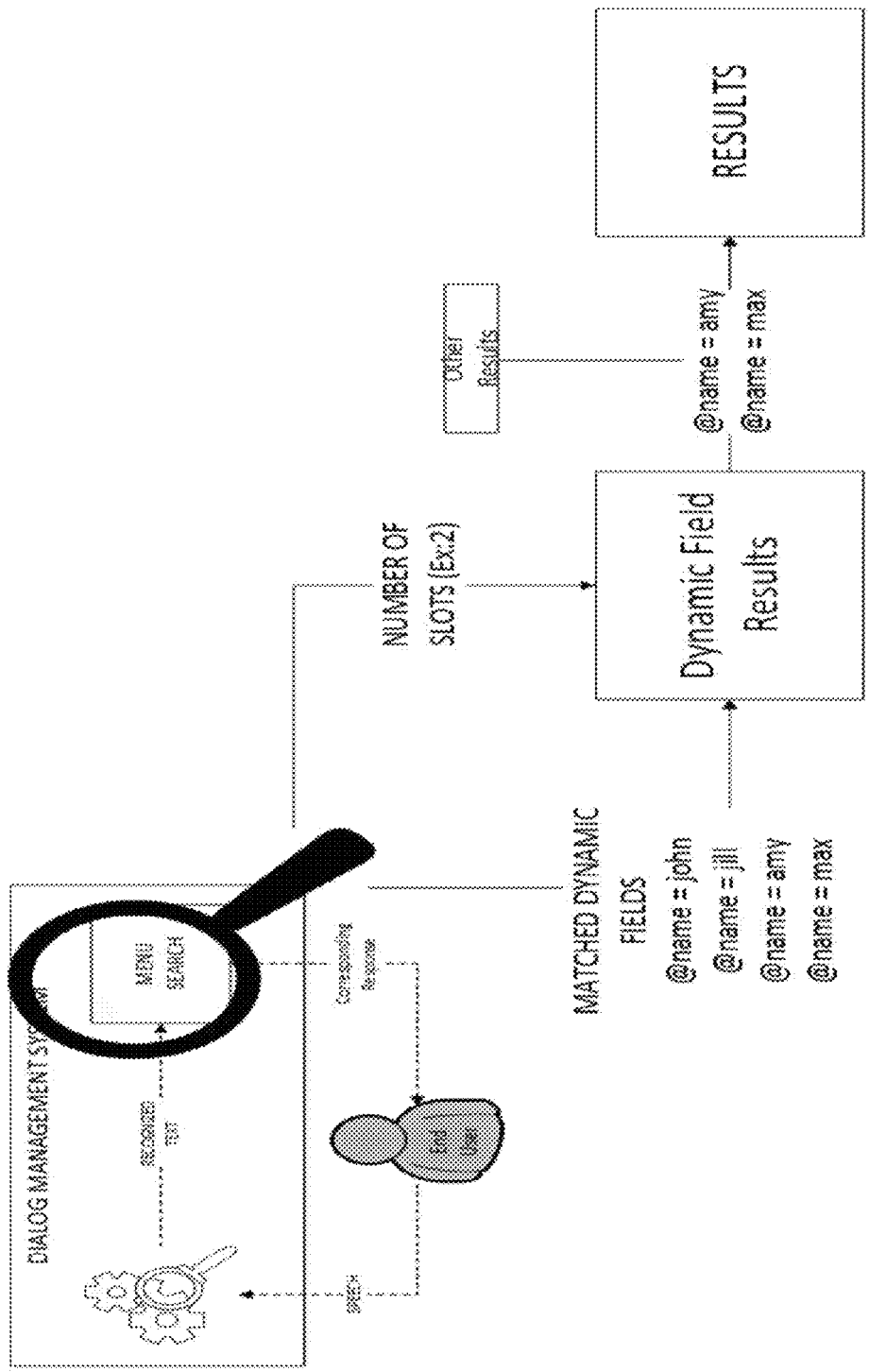
FIG. 10 illustrates the mechanism of maximum threshold of Dynamic fields.

Referring to FIG. 10, the mechanism of maximum threshold of Dynamic fields are illustrated.

After the outcomes of "Multiple Matching Phrases" and "No Matching Phrases", the DMS would further perform a conversion of words into terms. As a start for this step, the algorithm firstly converts all characters into lowercase and then removes punctuation marks and unnecessarily spaces. After, as mentioned before, all words recognized (beside dynamic fields, because they are already changed into terms.) become mapped according to the predefined term list. The aforementioned example, "sending 50 dollars to john" had changed into "sending @amount to @name" because of dynamic field search, after term detection became "send @amount to @name", because the word "sending" is mapped to the term "send".

After the word sequence has been converted into a term sequence, the DMS then begins the matching algorithm and adjacency filter. Wherein the adjacency filter is determined to ignore some terms in the searching algorithms, because their unique contribution to the meaning of a whole sentence is dependent on other terms.

Figure 11:
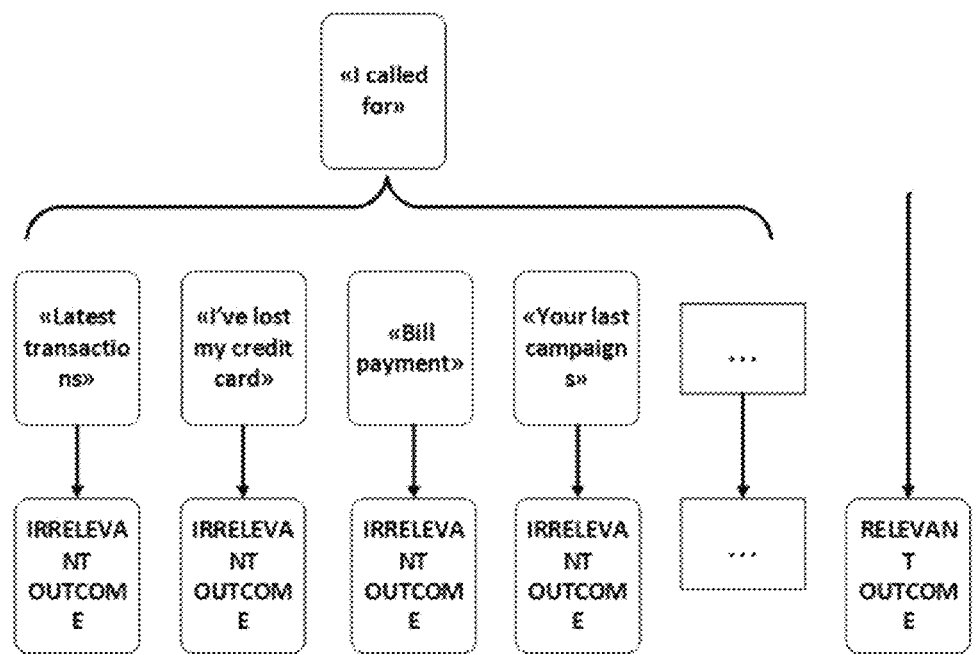
FIG. 11 illustrates an adjacency filtering example.

For instance, "call" term in "I called for getting information" does not contribute to the general meaning, because the words coming after the term are carrying the actual meaning. In addition, "I called for" can he a part of almost any phone call. Referring to FIG. 11, an adjacency filtering example, the possible outcomes of "call" term, is illustrated.

On the other hand, "I had a campaign call, and want to get information about it" has an essential "call", because it describes the purpose of phone call by itself. In this situation, if the "call" term is mapped into "Campaigns" menu created in the tree, both sentences match with it although "I called you for . . . " may not point to Campaigns. However, the probabilistic contribution of "call" can be dependent to "campaign" with the rule of "'call' is a term that contributes only if it comes near the 'campaign' term". This dependence, adjacency, closes the case because "call" in the first sentence is ignored. Referring to 12, adjacency filtering is applied to cases.

In this sense, the variations of the aforementioned rule structure are given below:

For a given term X, Y and arbitrary terms of $W_n$:

Y: In order for "X" to be valid, it should be placed next to the term "Y". The allowed order is "X Y" or "Y X".

!Y: In order for "X" to be valid, it should be placed after the term "Y". The allowed order is "Y X".

~Y: In order for "X" to be valid, it should be placed after the term "Y", or before the term "Y" within infinite distance. (This means an unlimited number of words may be placed between X and Y.)

Allowed orders are "Y Z W . . . X" or "X Y".

n~Y: In order for "X" to be valid, it should be placed after the term "Y", or before the term "Y" within n distance.

Allowed order is "Y $W_1$ $W_2$ $W_3$ . . . $W_{n-1}$ X" or "X Y".

These rules are also valid backwards or combination of the both such as Y!, Y~, Y~n or !Y~, n~Y~m, n~Y~. . .

Figure 13:
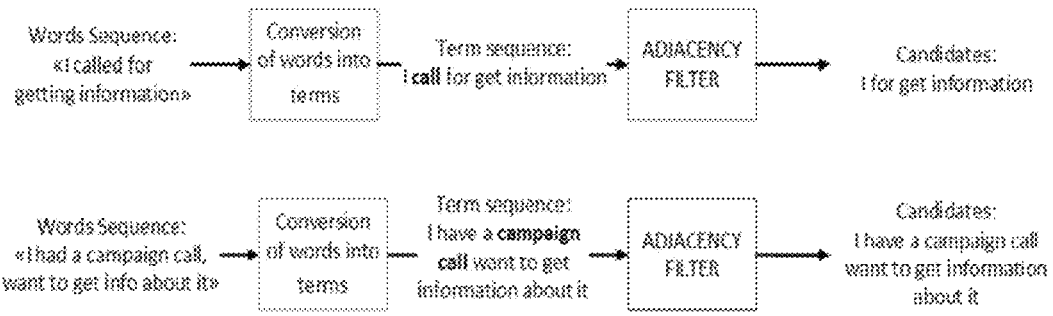
FIG. 13 illustrates an adjacenc example of how to eliminate terms with adjacency.

FIG. 13 is an example of how to eliminate terms with the adjacency filter.

Figure 12:
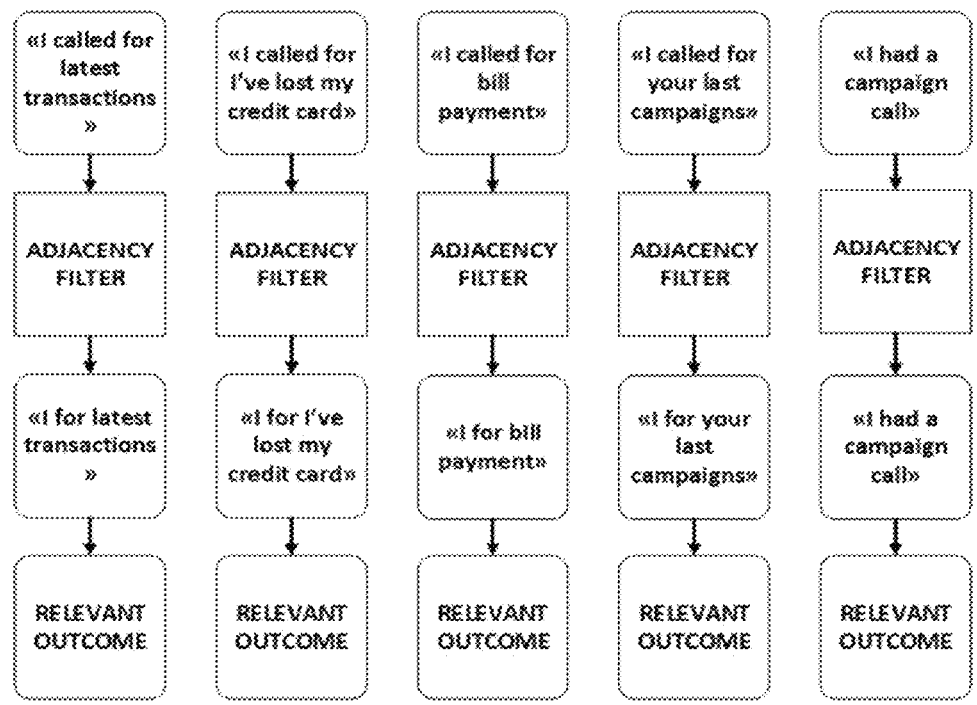
FIG. 12 illustrates example of applying adjacency filter.

In light of aforementioned adjacency rules, calls regarding a 3~campaign~3 (FIG. 12) seems suitable for the situation. According to the definition, call terms will be taken into account only if there are a maximum of 3 terms between call and campaign terms.

After the Adjacency Filter, the DMS is then performed to execute the final search. In order to manage searching, the algorithm calculates a probabilistic score in percentages for every node by comparing the terms in input text and the term series on the tree nodes one by one. If there is not a matching term in a node, then that node has a score of "0".

Figure 14:
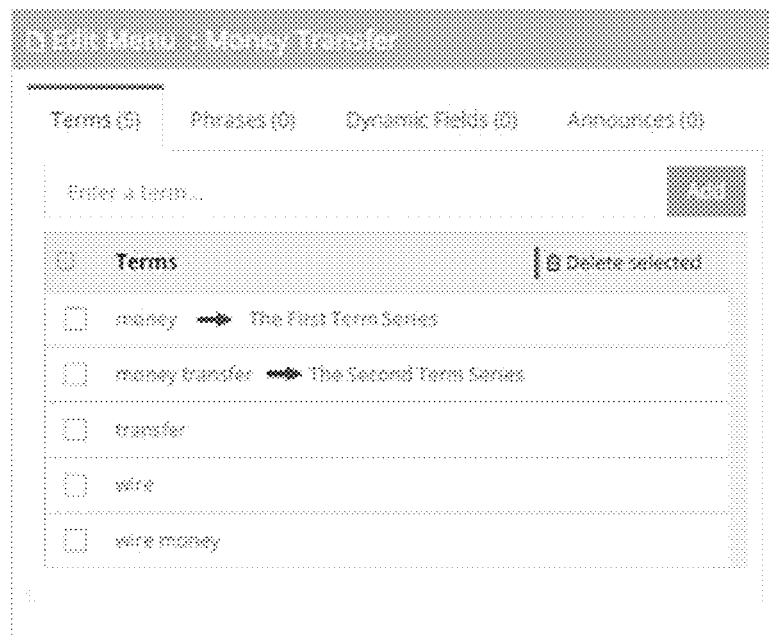
FIG. 14 illustrates term series for Money Transfer

FIG. 14 illustrates the term series for Money Transfer menu.

On the other hand, if a node has more than one term series matching with the recognized terms, the term series with the higher number of matching terms is accepted as the matched terms for that node.

Starting from the root node of the tree, every nodes' score is calculated with the contribution of parent nodes. In other words, if there is a matching term on a parent node, it will increase the score of a child node. To be exact, formula used for calculating probabilistic scores for every node is given below:

$$\text{Score} = 100 * \frac{K}{S + U1 + U2 + \ldots + UN}$$

Score: The probabilistic score of a specific node

K: The total number of matching terms of input text

S: The total number of terms in the term series with the highest number of matching terms within term series of given node UN: The total number of terms in a term series with the highest number of matching terms within the term series of parent nodes of given node Considering all the scores calculated for every node;

If all nodes take the score of zero percent, the search result will return "No Match". After a no match value is returned, a terminal is expected to announce to the end user that the given speech is needed to be paraphrased in order to get a higher chance to match with any node on the tree.

Figure 15:
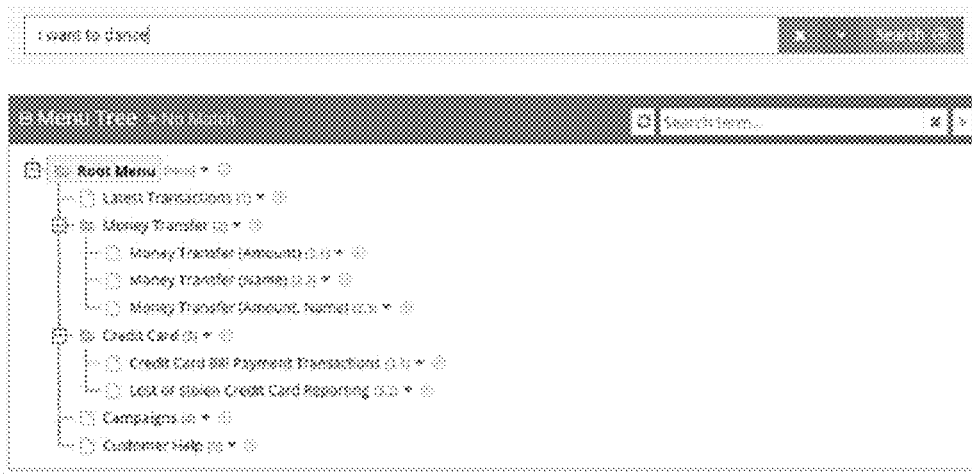
FIG. 15 illustrates the search result of "No Match".

FIG. 15 illustrates that when an end user says something irrelevant, terms will not probably match, the result will be No Match.

If the highest score is returned by a single node, this node will be selected as the matching menu. The search result will be a "leaf match" if the matching menu does not have any child node. Obtaining a leaf match can be interpreted as operation is completed according to DMS because there is no longer a need for further information to reach the correct menu.

Figure 16:
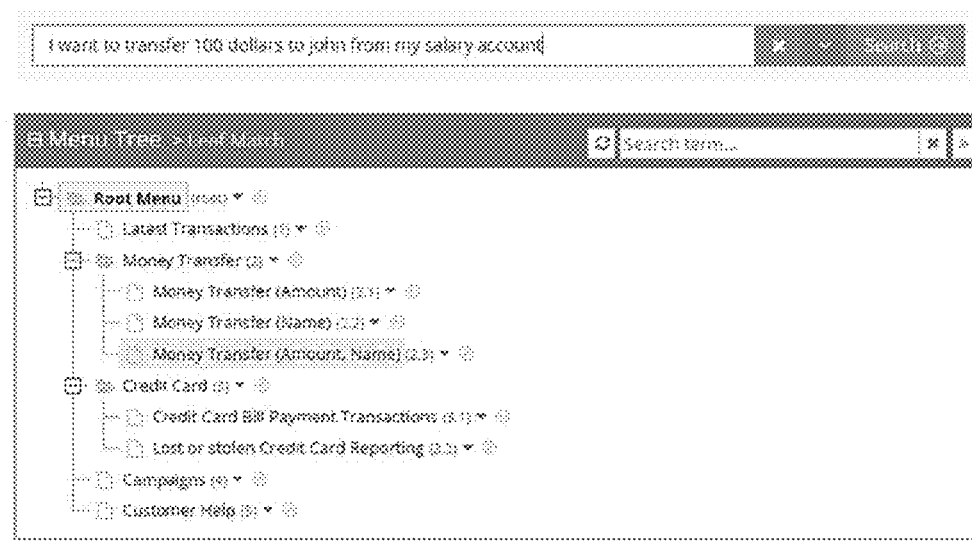
FIG. 16 illustrates a search result of "Leaf Match".

FIG. 16 illustrates that when end user says something relevant to a tee, terms will probably match and the result will be a leaf match.

However, if the>matching menu has a child node, the search result will be a "parent match". After a parent match, a terminal is expected to demand for more detailed information from the end user in order to reach a leaf match. If the next attempt gives enough information about the correct menu, it will result in a leaf match.

Figure 17:
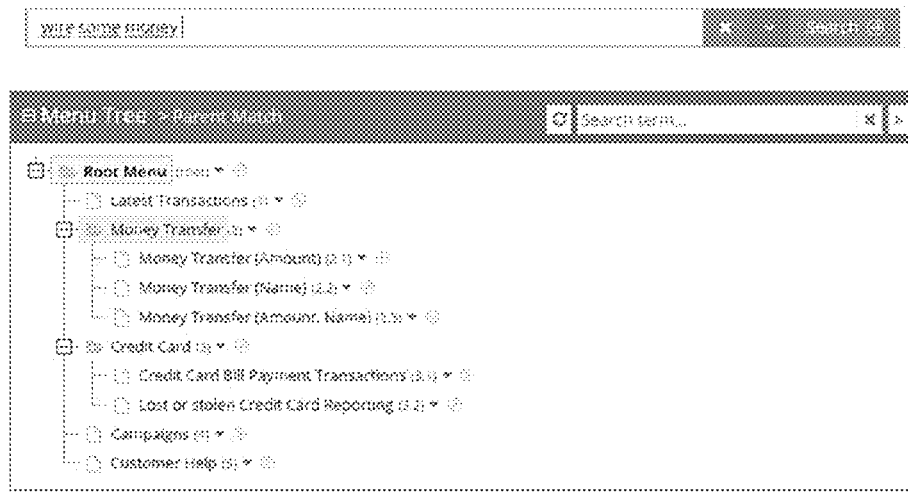
FIG. 17 illustrates a search result of "Parent Match".

FIG. 17 illustrates a situation when an end user says something relevant to a tree but not in enough detail to result in a leaf node match, terms will probably be sufficiently detailed to match with a parent node, resulting in a parent match.

If the highest score is returned by multiple nodes, the search result will be "multiple match" and all of the matching nodes will be returned as matching menus. After multiple match, terminal is expected to request more detailed information from the end user in order to result in a leaf match. If the next attempt gives enough information about the correct menu, it will result in a leaf match.

Figure 18:
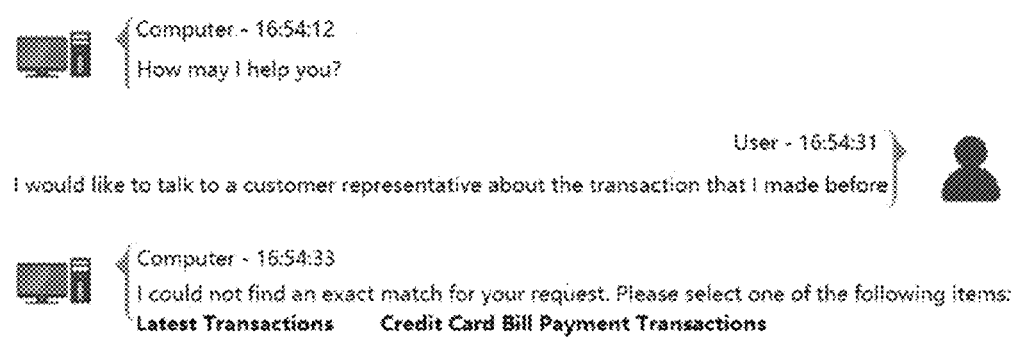
FIG. 18 illustrates an example of unnatural conversation.

Although DMS requests additional information in order to disambiguate multiple matches as a result of an input, requesting a new input is the last resort for disambiguation. The system allows us to mark specific menus as "Ignorable menu". These marked menus can be taken as matching menu unless there is any other menu which is not an ignorable menu. This feature resolves a great number of unnatural conversations. For instance, a user wants to get information about latest transactions but he/she expressed his/her intention by saying "I would like to talk to a customer representative about the transaction that I made before". In an ordinary design, the result will be a multiple match as shown in FIG. 18.

Since most customers would prefer talking to an agent they would say "customer help" at this point. However, for the purpose of efficiency most dialog systems are designed to encourage the user to complete their transactions within the dialog system. Therefore most systems would respond as "Let's try again, what would you like to do?", but would not transfer the user to an actual customer representative.

Figure 19:
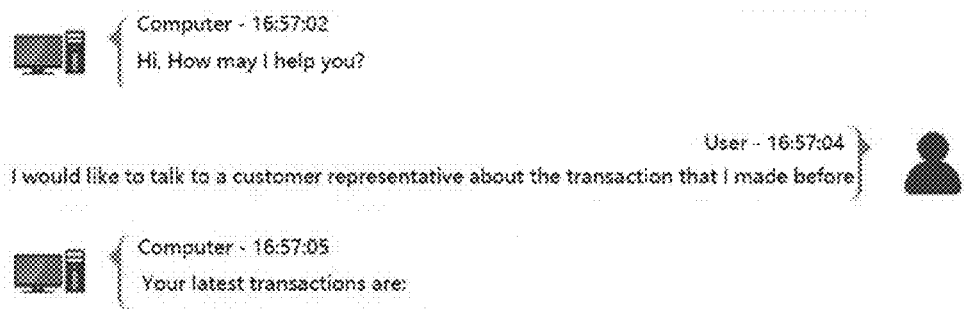
FIG. 19 illustrates an example of "ignorable menu" used in the unnatural conversation shown in FIG. 18.

In order to avoid this type of confusing and long conversations, the Customer Help menu can be marked as an "ignorable menu". In this case, conversation flow would be like as shown in FIG. 19.

Figure 20:
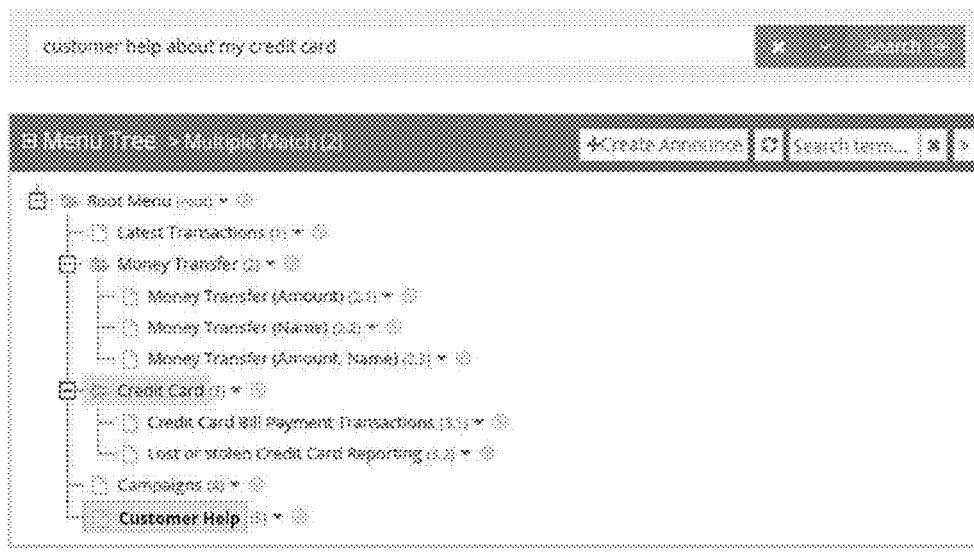
FIG. 20 illustrates a search result of "Multiple Match".

FIG. 20 illustrates that when an end user says something relevant to a tree but prevalent in generalities, or directly related to multiple nodes, terms will probably match with several nodes, the result will be a multiple match.

If multiple nodes that contain a phrase match were found in a search for phrases, the search algorithm works similarly to the process explained above. In this case, instead of calculating the scores of all nodes, calculating scores for only nodes matched in phrases and searching the highest score within them is the path that the algorithm adopts.

Figure 21:
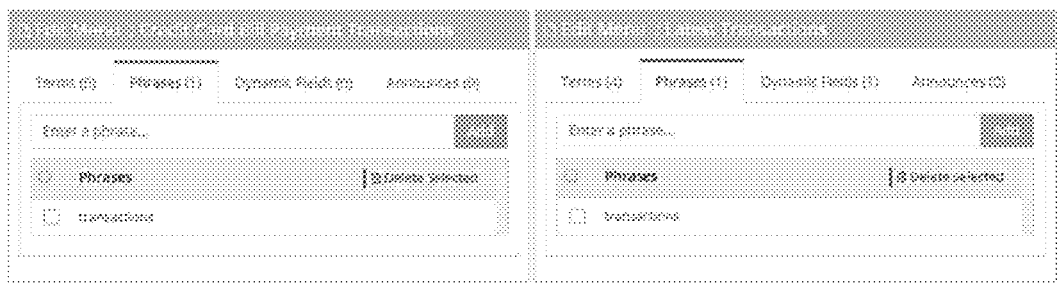
FIG. 21 illustrates menu of phrase.
Figure 22:
FIG. 22 illustrates multiple phrase match example.

FIG. 20 illustrates that "transactions" is defined as a phrase in Latest Transactions and Credit Card Bill Payment Transactions, resulting in a multiple match. FIG. 21 illustrates a multiple phrase match example. The algorithm continues to search in terms and finds a higher score when it reaches Latest Transactions.

Depending on the aforementioned operations, final results should be delivered to the terminal. In order to avoid redundancy, only the parameters that are used by terminals are posted. The rest of the parameters are stored in database and reported on DMS user interface to be used when needed.

Matched menu information and a count of matched menus are passed to terminal. Depending on the matched menu, a terminal will execute the requested operation. In some cases, terminal may decide to ask for more detail because of the high value of a match count.

In addition to menu information, announcement of the matched menu in written format and the path of the announce file as a recording. In the following action, the terminal announces the given text or plays the given record to the user.

The final confidence value indicating reliability level of results is passed. This variable is the product of CV derived from SR and a score derived from the search algorithm. Terminals may not choose to execute operation pointing by DMS depending on lowness of confidence value. Unexpected sounds, a speaker-humming or a noisy background can result in a reduction in accuracy of SR and lower confidence values. Furthermore, low CV will be interpreted as a risk of failure in dialog management and another response will be demanded from the end user.

An indicator of dynamic field collection completion, which returns a true/false parameter, is also sent to the terminal. This is done to decide whether all of necessary dynamic fields have been collected. If they have not all been collected, terminal may choose asking for the missing fields.

In dialog management systems, announcement is the simplest way to transfer a message to the end-user. Two-way communication is achieved by combining the response of the user with the system synchronously. At the end, a communication scheme is built from a cycle containing the user's input and the corresponding response to it. This cycle repeats itself until the main goal of communication is accomplished.

Figure 23:
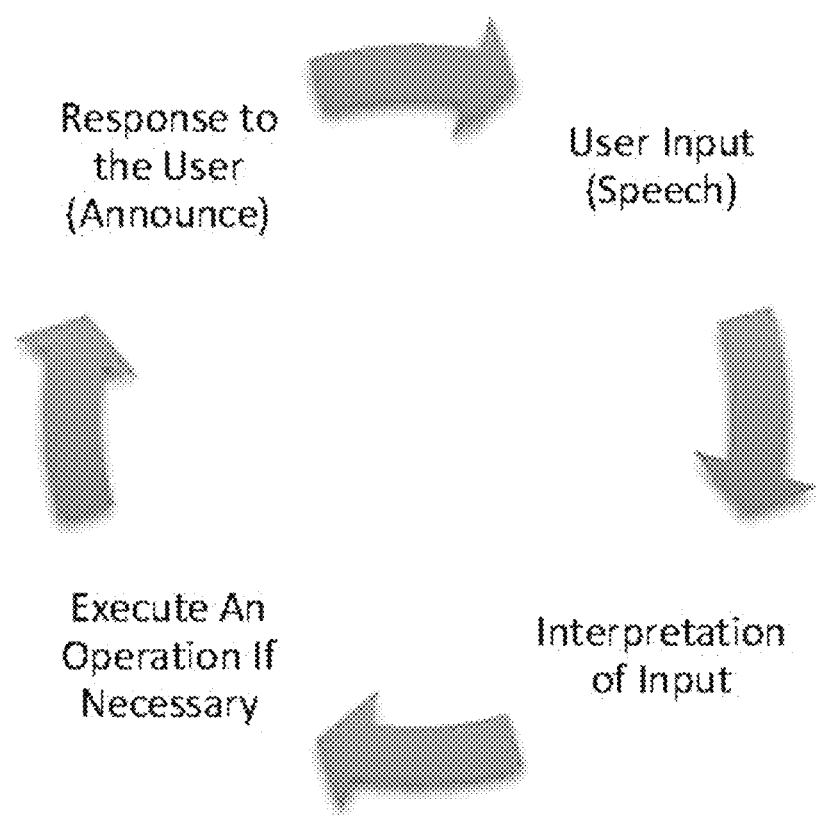
FIG. 23 illustrates terminal & user communication cycle.

Interaction with a system is a repetitive action from both ends of communication. In some operations, many parameters are needed for execution. As a result, the cycle in FIG. 23 iterates until all of the parameters are collected. This process may annoy or tire users if it is implemented in an unnatural way. At this point, the speech is chosen as a natural communication method by the DMS. In order to maintain integrity, the system's response should also be speech. The predefined responses of the system consist of spoken words are called announcements. The announcements instruct users to reach an intended operation by calling for missing parameters or explaining the current location in the DMS tree. For example, if the system has multiple possible operations but cannot decide which operation is needed, an announcement will ask the user to choose one of the given options or provide new information. Confliction can be resolved within a few iterations of this method.

In our DMS system, when a user provides a speech input, not only are the speech to text output, dynamic fields, and intent of the user returned but the necessary reply announcement waveform file link and/or reply text are also returned to the terminal application whether it is an IVR scenario or a mobile phone application.

In a natural dialog between two speakers, any response given to a certain question may change when the question is paraphrased or repeated without any change. Speakers express their thoughts with different words because thoughts and conditions are continuously changing. In order to maintain this flow, a natural system has to change its responses while speaking with the same user over time. DMS picks a random announcement from a predefined set of announcements. If the user remains the same, the system tries to respond with different answers.

In many dialog systems announcements are determined by general templates or a predefined list containing all possible matches including combinations of multiple matches. The both approaches create inefficiency. Answering all requests in the same way is unnatural. On the other hand, preparing answers to all situations is very exhausting.

Figure 24:
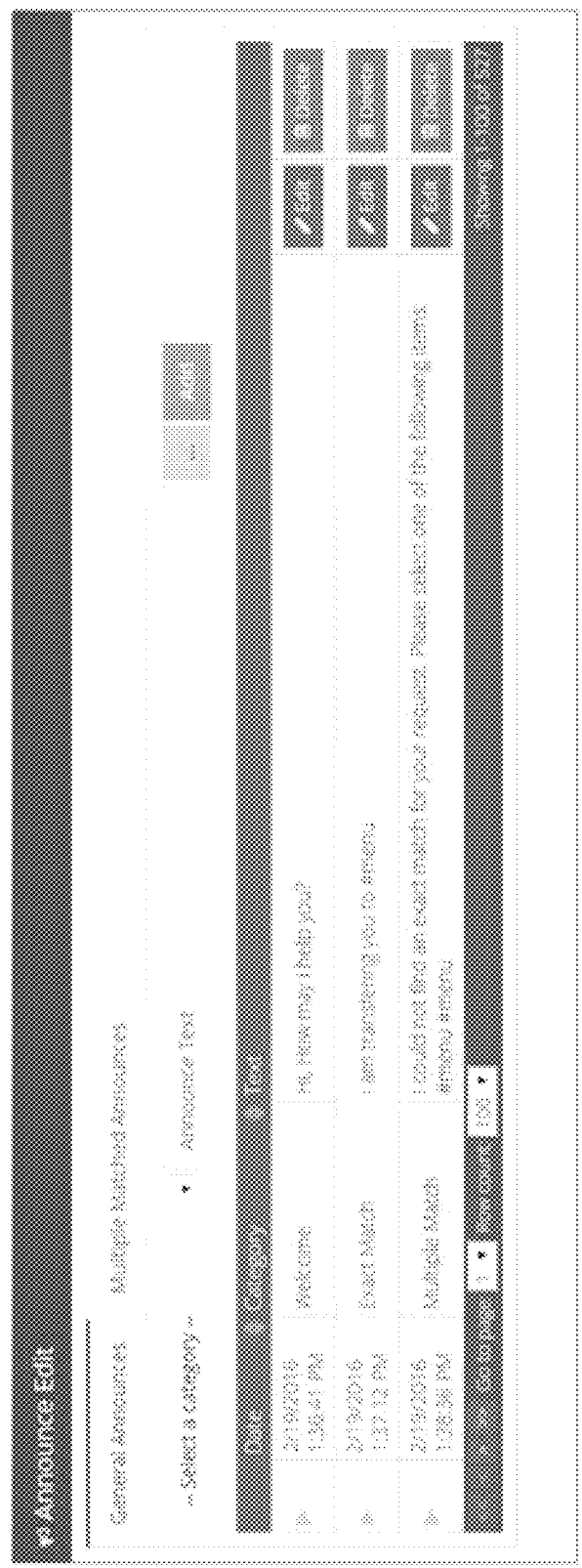
FIG. 24 illustrates general announces defined by the designer.
Figure 25:
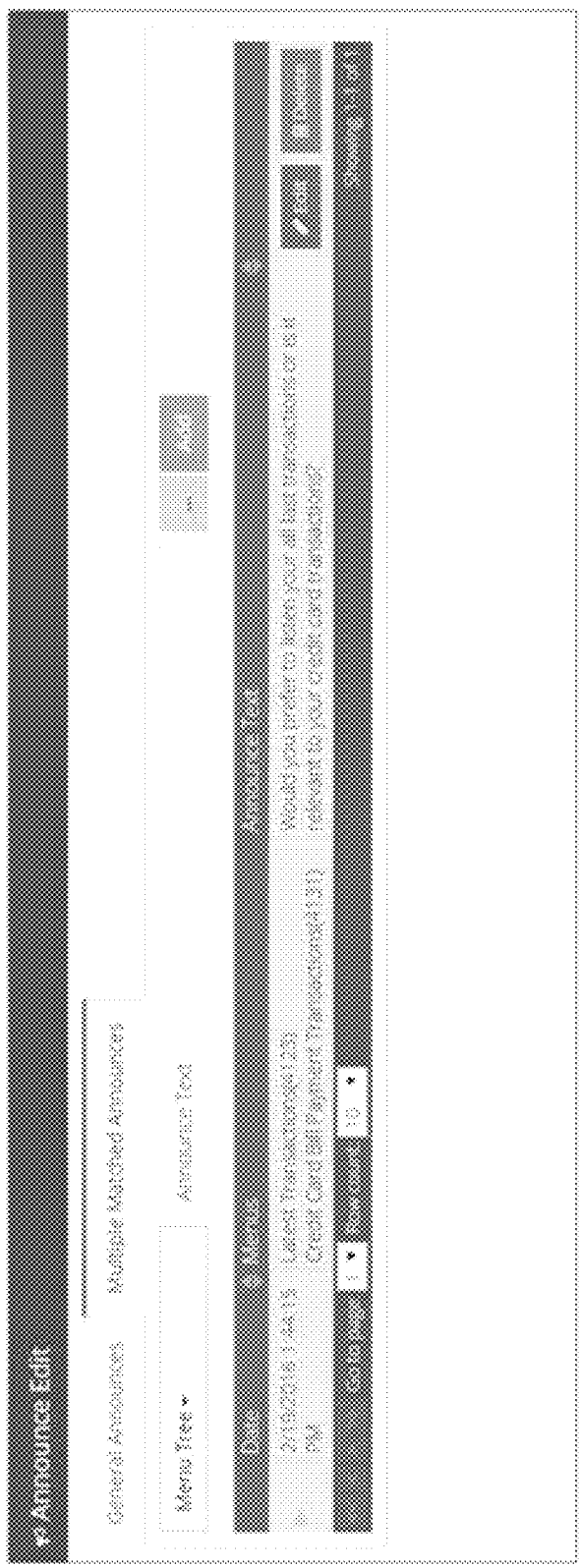
FIG. 25 illustrates a specific multiple match condition which contains "Latest Transaction" and "Credit Card Dill Payment Transactions" in the example tree.

In our approach, designer is allowed to determine specific multiple match announces in order to disambiguate the intent in a natural way in addition to general responses which can respond to all inputs in a semantically correct way. FIG. 24 shows general announces defined by the designer. FIG. 25 shows a specific multiple match condition which contains "Latest Transactions" and "Credit Card Bill Payment Transactions" in the example tree.

FIG. 24 and FIG. 25 are telling that in any multiple match situation excluding the one with "Latest Transactions" and "Credit Card Bill Payment Transactions", system will respond as "I could not find an exact match for your request. Please select one of the following items: #menu(1) #menu(2)".

One of the ways of making the system More human-like is creating a persona for the system which has an important contribution to naturalness of the dialogs. In order to create a persona, announcements should be prepared considering previously designed personality of the system. And this type of design process should be repeated in the creation of every persona. Creating multiple personas for different segments of customers is a necessity for implementations with a wide user profile range. In this scenario, an implementation obstacle occurs. Creating the same tree multiple times is an unnecessary burden. Instead, the same tree should respond differently for different circumstances. A flag logic is created for this need. In case of necessity designer can assign specific flags to announce. And the client application may request specific flagged announces considering customer's age, education or any demographic data.

Figure 26:
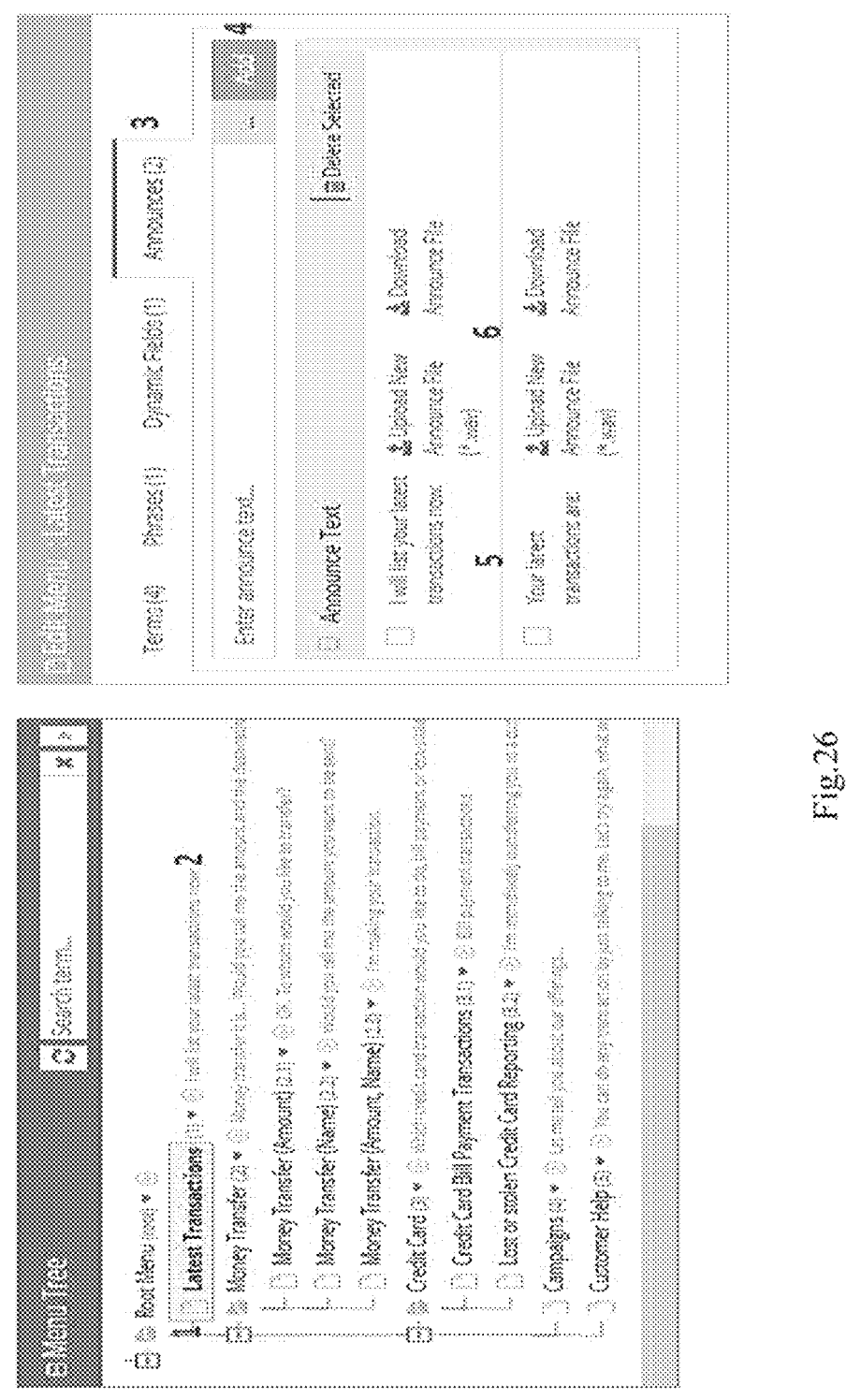

FIG. 26 illustrates the announcement management. The selected node (1), and example announcement selected from Announce List (2), Announce List (3), Add button for new announcements (4), The announcements in text form (5), Record editing for given announcements (6).

Figure 27:
FIG. 27 illustrates an example for random announcing system.
Figure 28:
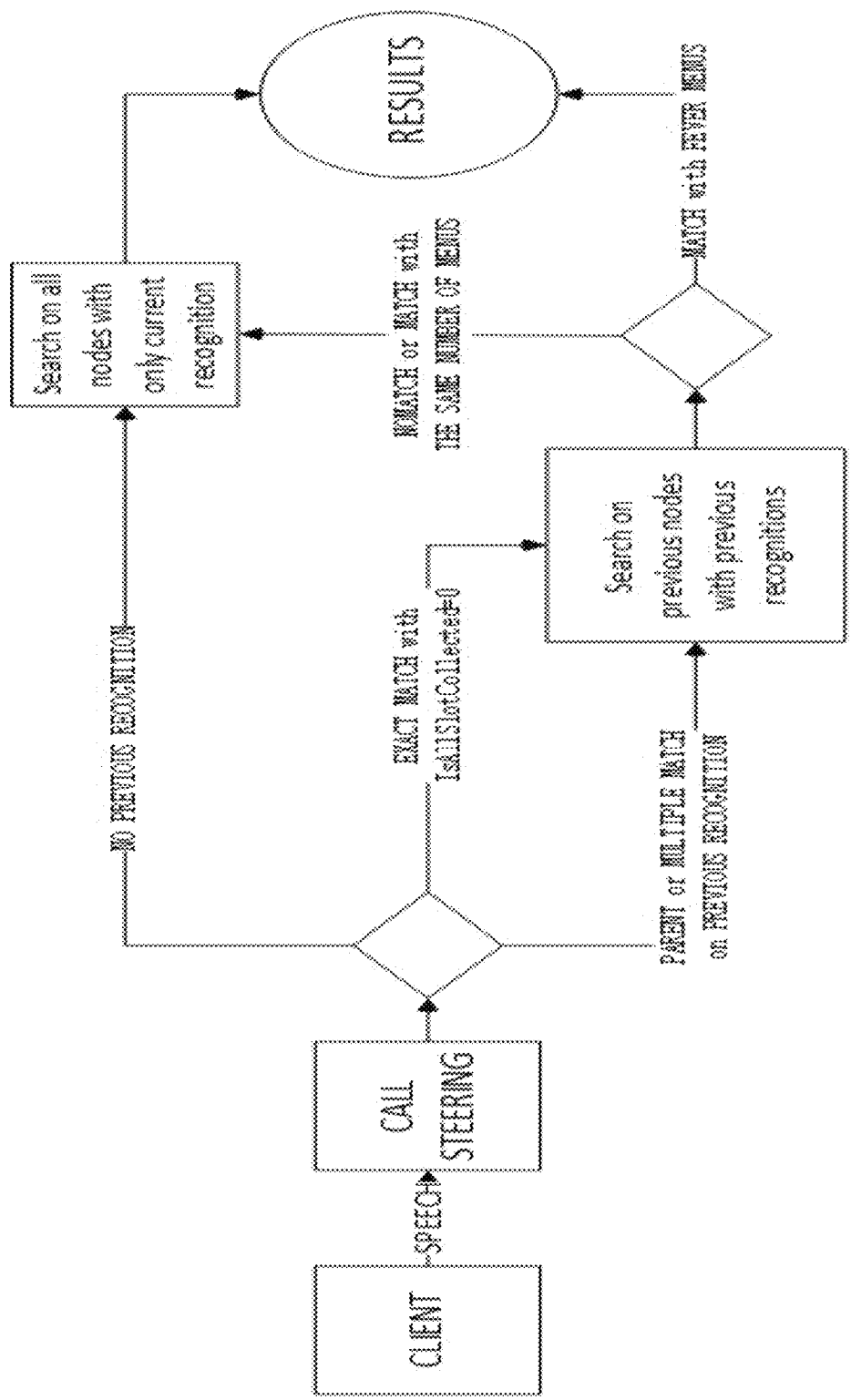
FIG. 28 illustrates the searches on consecutive requests.

FIG. 27 illustrates air example for random announcing system.

In addition to aforementioned positive impacts of random announcements on dialogs, managing announcements from a GUI creates an opening to change architecture. When a change of announcements is required, instead of changing the terminal's hardcoded flow, changing the content of an announcement from DMS GUI is highly cost-effective.

Many DMS applications aim for leaf matches because leaf match equates to a unique operation Until a leaf match is reached, terminal should ask for details about the operation intended by the end-user.

Figure 30:
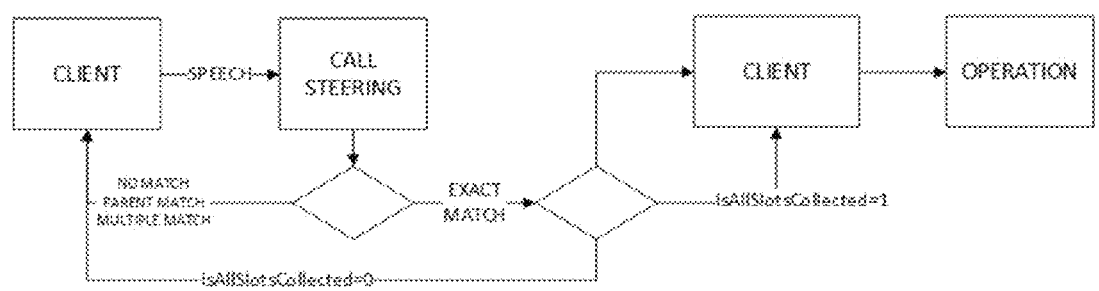
FIG. 30 illustrates dialog management using scheme considering dynamic fields.

At this point, it is crucial to estimate behavior of the end user. In most cases, terminals are inclined to offer choices for matched menus in previously recognized text or information about the paths which can be selected by the user. Afterward, a user speaks to SR again and new recognized text is obtained. Now, the recognized text is a response to the instruction given by previous matches. The previous recognized texts should be taken into account while searching. In order to accomplish this type of consecutive searches, the search algorithms searches for new recognized text while comparing with text in the database. Furthermore, this search is achieved by using the score formula only for the nodes of a tree which were previously matched (parent or multiple matches) instead of all nodes on the tree. If the result is a leaf match or a multiple match with fewer nodes, then the new result is accepted. Otherwise, the algorithm makes a new search using only the last recognized text on all nodes of the tree. (FIG. 30). The algorithm decides to make a new search with the last input, because it assumes that there is no progress in intent matching process and maybe the user changed his/her mind. In this case, automatic path change detection is achieved. If the intent is unchanged but the utterance cannot produce any progress, responding with an announcement that requests more detail is still a better choice rather than responding with the same match results.

Figure 29:
FIG. 29 illustrates the searches on consecutive requests.

In FIG. 29, by saying "something about my card I think", user demands "Credit Card" menu first. Later, behavior is changed and by saying "no no I just want to know about my latest transactions", "Latest Transactions" menu is asked. After the second recognition has happened, the algorithm searches new recognition with the previous search viewed as a single sentence, i.e., "something about my card I think no no I just want to know about my latest transactions", in the matched menu before, Credit Card. After the algorithm matches the same two menus in those two menus, it searches for "no no I just want to know about my latest transactions" in every menu on the tree and finds a leaf match on "Latest Transactions".

By searching again, loops and dead-end processes caused by user mistakes are also avoided.

In order to get all the information needed for steering the user to the correct menu, the terminal may repeatedly ask for detail. On the other hand, forcing the user to give unnecessary details will probably result in feelings of interrogation. Considering these facts, DMS trees are designed in a way that only specific situations trigger a terminal to get more details. (FIG. 30).

If the search result is No Match, Parent Match or Multiple Match, the terminal will probably ask for additional details and the algorithm will process last two recognitions together, In case of a Leaf Match, the IsAllSlotsCollected parameter should be expected from the Dialog Management System. If that parameter is missing, then the node matched does not need any dynamic fields in order to complete the search. If IsAllSlotsCollected is collected and its value is 1, it means a unique leaf node has been found with all dynamic field requirements. On the other hand, if IsAllSlotsCollected is collected but its value is 0, the terminal should ask for missing dynamic fields to complete the relevant operation. It means a leaf node has been found, but at least one required dynamic field is missing. And the operation cannot be executed until all the necessary dynamic fields are completed.

The following is a consecutive search example in order to reach a leaf node with IsAllSlotsCollected=1.

Figure 31:
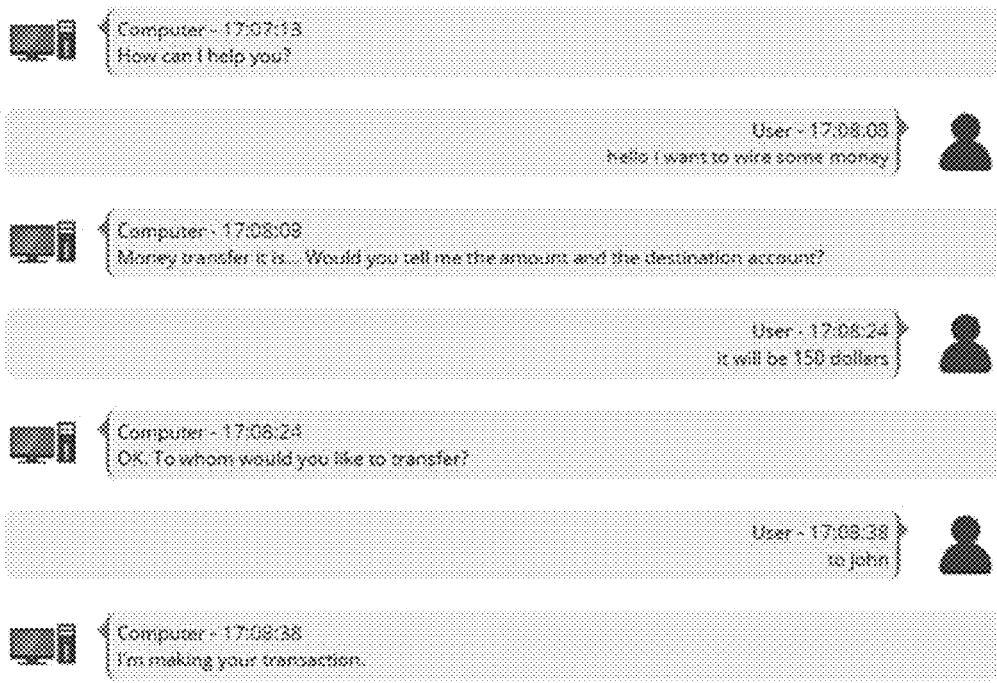
FIG. 31 illustrates an example of how to collect all necessary information.
Figure 32:
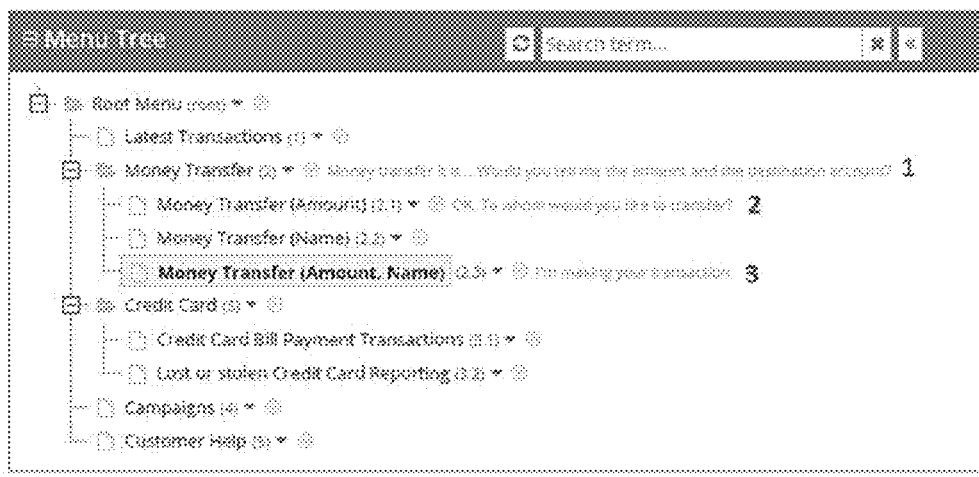
FIG. 32 illustrates the Menu Tree of the example in FIG. 23.

Analysis is made using the above dialog. First, recognition steers to the Money Transfer parent match (1 in FIG. 32). With the aim of reaching a leaf node, the client gives predefined announce and waits for another recognition. In the second recognition the leaf node Money Transfer (Amount) is matched (2 in FIG. 32). Because all of the money transfer menus are required to fill at least one amount and one name dynamic field, IsAllSlotsCollected=0 is passed. And as described in FIG. 31 another recognition is asked. The last recognition contains the last missing dynamic field and it steers to Money Transfer (Amount, Name) (3 in FIG. 32).

There are multiple advantages of this invention:

I. Context matching via term mapping over statistical matching, which is fast and easy to implement and reduce complexity.

II. Simultaneous intent matching and form filling capability.

III. Implementation convenience of language specific term mapping

IV. Dynamic fields Model training integration

V. Opportunity to overwrite or augment a dynamic field slot

VI. A general announce template can be used with intent specific announces assisted by unique disambiguation announces.

VII. Automatic dialog path change detection.

The present invention has been described with the preferred embodiments necessary for a successful patent application. It is foreseeable that a variety of modifications and changes may be made without departing from the scope of the patent for invention. Those changes or modifications will be defined in appended claims.

The invention claimed is:

1. A computer implemented method for dialog management, comprising the steps of:
    S1000: receiving an utterance from a user by a terminal;
    S2000: recognizing and converting the utterance from sound into sequential words in a written text;
    S3000: determining if there is a phrase in the written text matching with a predefined phrase in a menu tree; wherein the menu tree comprises a root node, the root node comprises a plurality of parent nodes, and each parent node comprises at least one leaf node, each leaf node corresponds to an operation, each of the predefined phrases corresponds to a parent node or a leaf node;
    if the phrase in the written text matches with more than one of the predefined phrases in the menu tree,
        S3110: attempting to recognize at least one dynamic field in the written text;
        S3120: converting the sequential words into corresponding predefined terms in sequence, wherein different words with similar meaning are converted into a term; each of the predefined terms corresponds to a parent node or a leaf node;
        S3130: matching terms with the corresponding parent node or leaf node in a matched phrase node;
        S4000: conducting the operation according to the matched phrase node;
    if the phrase in the written text matches with exactly one of the predefined phrase in the menu tree,
        S3210: attempting to recognize at least one dynamic field in the written text;
        S3220: matching the phrases with the parent node or the leaf node,
        S4000: conducting the operation according to the matched phrase node;
    if the phrase in the written text does not matches with any of the predefined phrase in the menu tree,
        S3310: attempting to recognize at least one dynamic field in the written text;

S3320: converting the sequential words into corresponding predefined terms in sequence, wherein different words indicating the similar intent are converted into a term;

S3330: matching the terms with the corresponding parent node or leaf node in all nodes;

S4000: conducting the operation according to the matched phrase node.

2. The method according to claim 1, wherein said dynamic field is used for intent matching.

3. The method according to claim 1, wherein a minimum and a maximum occurrence threshold are predetermined for recognizing the dynamic field in order to handle inadequate or excessive data.

4. The method according to claim 3, further comprising:
executing an indicator of a result of the recognized dynamic fields, in order to decide whether all necessary dynamic fields are collected or not;
if the necessary dynamic fields have not been recognized, prompting to ignore the missing dynamic fields or starting another recognition.

5. The method according to claim 1, further comprising:
after the step of converting the sequential words into corresponding predefined terms in sequence, filtering the converted terms to obtain key terms.

6. The method according to claim 5, wherein the step of filtering the converted terms to obtain key terms is carried out by a predefined adjacency filter rule.

7. The method according to claim 1, wherein,
the computer is capable of announcing a given text or a given record to the user according to the conducted operation.

8. The method according to claim 7, wherein the announced text or record comprises general announcements and specific announcements; wherein the computer is capable of fusing the general announcements and the specific announcements.

9. The method according to claim 7, wherein, if there is multiple matching, the computer is capable of creating specific multiple match responses.

10. The method according to claim 7, wherein the dynamic fields are used to create multiple announcements with similar intent.

11. The method according to claim 7, wherein an announcement database is created for a plurality of customer segments; wherein the plurality of customer segments are categorized according to age, education, and demography of customers; wherein for the same conducted operation, the announcement corresponding to the customer segment in which the user falls is played from the announcement database.

12. The method according to claim 11, wherein the announcement database corresponding to each customer segment is further divided into a plurality of sub-databases corresponding to a plurality of system personas, wherein each sub-database in a particular customer segment provides a different announcement for the same conducted operation, wherein the announcement for the same conducted operation is selected from a specific sub-database based on a predefined circumstance.

13. The method according to claim 1, wherein sentences containing the dynamic fields are given to the computer in order to produce training sentences.

14. The method according to claim 1, wherein a plurality of responses are assigned for each operation and the computer randomly selects and announces a first response from said plurality of responses for the same conducted operation; after announcing said one response if the user inputs the same operation again, the computer randomly selects and announces a second response from said plurality of responses, wherein the second response is different from the first response.

* * * * *